United States Patent
Madden et al.

(10) Patent No.: US 12,098,679 B2
(45) Date of Patent: Sep. 24, 2024

(54) STAGED COMBUSTOR

(71) Applicant: Rolls-Royce plc, London (GB)

(72) Inventors: Christopher P Madden, Derby (GB); David M Beaven, Nottingham (GB); Craig W Bemment, Derby (GB); Paul W Ferra, Derby (GB); Barani P Gunasekaran, Derby (GB); Benjamin J Keeler, Chesterfield (GB); Peter Swann, Derby (GB); Martin K Yates, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/337,615

(22) Filed: Jun. 20, 2023

(65) Prior Publication Data

US 2024/0209791 A1 Jun. 27, 2024

(30) Foreign Application Priority Data

Dec. 21, 2022 (GB) .................................... 2219423

(51) Int. Cl.
| | |
|---|---|
| *F02C 7/262* | (2006.01) |
| *F23R 3/34* | (2006.01) |
| *F02C 7/22* | (2006.01) |
| *F02C 7/264* | (2006.01) |
| *F02C 9/46* | (2006.01) |
| *F23R 3/28* | (2006.01) |

(52) U.S. Cl.
CPC .............. *F02C 7/262* (2013.01); *F23R 3/343* (2013.01); *F02C 7/222* (2013.01); *F02C 7/264* (2013.01); *F02C 9/46* (2013.01); *F23R 3/28* (2013.01)

(58) Field of Classification Search
CPC ....................................................... F02C 7/262
See application file for complete search history.

(56) References Cited

U.S. PATENT DOCUMENTS

| | | | |
|---|---|---|---|
| 3,264,825 A | | 8/1966 | Leslie et al. |
| 5,027,603 A | | 7/1991 | Shekleton et al. |
| 5,257,500 A | * | 11/1993 | Venkataramani ....... F02C 7/264 219/121.52 |

(Continued)

FOREIGN PATENT DOCUMENTS

| | | |
|---|---|---|
| EP | 3 568 637 B1 | 11/2019 |
| FR | 3 032 010 A1 | 7/2016 |

(Continued)

OTHER PUBLICATIONS

The Engineering ToolBox (2003). Fuels—Higher and Lower Calorific Values. [online] Available at: https://www.engineeringtoolbox.com/fuels-higher-calorific-values-d_169.html. (Year: 2003).*

(Continued)

*Primary Examiner* — Gerald L Sung
*Assistant Examiner* — Alyson Joan Harrington
(74) *Attorney, Agent, or Firm* — Oliff PLC

(57) ABSTRACT

There is provided a method of operating a gas turbine engine. The gas turbine engine comprises a staged combustor comprising an arrangement of fuel spray nozzles in which fuel flow is biased to a subset of the nozzles adjacent one or more ignitors during a re-light procedure. The method comprises providing fuel to the combustor having a calorific value of at least 43.5 MJ/kg. Also disclosed is a gas turbine engine.

20 Claims, 6 Drawing Sheets

(56) References Cited

U.S. PATENT DOCUMENTS

| | | |
|---|---|---|
| 11,920,514 B1 | 3/2024 | Bemment et al. |
| 2012/0216449 A1* | 8/2012 | Hayasaka ................ C10G 3/46 |
| | | 44/307 |
| 2013/0036741 A1* | 2/2013 | Prociw .................. F23D 17/002 |
| | | 60/746 |
| 2013/0125556 A1 | 5/2013 | Hoke et al. |
| 2013/0199200 A1* | 8/2013 | Hoke ...................... F02C 7/228 |
| | | 60/776 |
| 2013/0305735 A1 | 11/2013 | Ahn |
| 2014/0033731 A1 | 2/2014 | Rackwitz |
| 2016/0146117 A1 | 5/2016 | Swann |
| 2016/0161123 A1 | 6/2016 | Patel et al. |
| 2017/0175019 A1 | 6/2017 | Ginestra et al. |
| 2017/0356654 A1 | 12/2017 | Locke et al. |
| 2022/0195938 A1 | 6/2022 | Ryon et al. |
| 2022/0381186 A1 | 12/2022 | Adique et al. |
| 2023/0332543 A1 | 10/2023 | Bemment et al. |

FOREIGN PATENT DOCUMENTS

| | | | |
|---|---|---|---|
| GB | 2614608 A | 7/2023 | |
| JP | 2021-89101 A | 6/2021 | |

OTHER PUBLICATIONS

Sep. 7, 2023 Office Action issued in U.S. Appl. No. 18/337,477.
Chevron, Aviation Fuels Technical Review, 2007 (Year: 2007).
SkyNRG, Sustainable Aviation Fuel, May 17, 2022 (Year: 2022).
Huq et al., Toward net-zero sustainable aviation fuel with wet waste-derived volatile fatty acids, Mar. 15, 2021 (Year: 2021).

\* cited by examiner

STAGED COMBUSTOR

CROSS-REFERENCE TO RELATED APPLICATIONS

This specification is based upon and claims the benefit of priority from UK Patent Application Number 2219423.7 filed on 21 Dec. 2022, the entire contents of which are incorporated herein by reference.

BACKGROUND

Field of the Disclosure

The present disclosure relates to a method of operating a gas turbine engine using fuels different from traditional kerosene-based jet fuels.

Description of the Related Art

There is an expectation in the aviation industry of a trend towards the use of fuels different from the traditional kerosene-based jet fuels generally used at present.

SUMMARY

According to a first aspect there is provided a method of operating a gas turbine engine. The gas turbine engine comprises a staged combustor in which fuel is combusted. The combustor comprises an arrangement of fuel spray nozzles in which fuel flow is biased to a subset of the fuel spray nozzles adjacent one or more ignitors during a re-light procedure. The method comprises providing fuel to the combustor having a calorific value of at least 43.5 MJ/kg.

The inventors have appreciated that the calorific value of the fuel has an effect on the ability of the gas turbine engine to re-light (for example, enabling easier re-light). Fuels with a higher calorific value may also have a greater thermal stability, allowing the fuel to take in more heat and thereby improving combustion of the fuel in the combustor and/or improved oil cooling (for example, if heat is transferred to the fuel from oil via a fuel-oil heat exchanger). The calorific value of the fuel must therefore be considered when delivering fuel to fuel spray nozzles of the combustor during a re-light procedure.

The method may comprise providing fuel to the combustor having a calorific value of between 43.5 MJ/kg and 44 MJ/kg.

The method may comprise providing fuel to the combustor having a calorific value of at least 43.8 MJ/kg.

The method may comprise providing fuel to the combustor having a calorific value of between 43.8 MJ/kg and 44 MJ/kg.

The fuel provided to the combustor may have an aromatic content of 10% or lower by volume, preferably 5% or lower and further preferably 1% or lower.

The gas turbine engine may comprise a fuel-oil heat exchanger. The method may comprise transferring heat from oil to the fuel before the fuel enters the combustor so as to lower the fuel viscosity to 0.58 $mm^2/s$ or lower on entry to the combustor at cruise conditions, preferably 0.48 $mm^2/s$ or lower, preferably between 0.40 $mm^2/s$ and 0.48 $mm^2/s$ and preferably between 0.42 $mm^2/s$ and 0.44 $mm^2/s$.

According to a second aspect there is provided a gas turbine engine for an aircraft. The gas turbine engine comprises a staged combustor in which fuel is combusted. The combustor comprises an arrangement of fuel spray nozzles and one or more ignitors. The gas turbine engine comprises a controller configured to bias fuel flow to a subset of the fuel spray nozzles adjacent the one or more ignitors during a re-light procedure, the fuel having a calorific value of at least 43.5 MJ/kg.

The fuel may have a calorific value of between 43.5 MJ/kg and 44 MJ/kg.

The fuel may have a calorific value of at least 43.8 MJ/kg.

The fuel may have a calorific value of between 43.8 MJ/kg and 44 MJ/kg.

The fuel provided to the combustor may have an aromatic content of 10% or lower by volume, preferably 5% or lower and further preferably 1% or lower The gas turbine engine may comprise a fuel-oil heat exchanger. The controller may be configured to transfer heat from oil to the fuel within the fuel-oil heat exchanger before the fuel enters the combustor so as to lower the fuel viscosity to 0.58 $mm^2/s$ or lower on entry to the combustor at cruise conditions, preferably 0.48 $mm^2/s$ or lower, preferably between 0.40 $mm^2/s$ and 0.48 $mm^2/s$ and preferably between 0.42 $mm^2/s$ and 0.44 $mm^2/s$.

According to a third aspect there is provided a method of operating a gas turbine engine. The gas turbine engine comprises a staged combustor in which fuel is combusted. The combustor comprises an arrangement of fuel spray nozzles in which fuel flow is biased to a subset of the fuel spray nozzles adjacent one or more ignitors during a re-light procedure. The method comprises providing fuel to the combustor having an aromatic content of 10% or lower by volume.

The inventors have appreciated that the aromatic content of the fuel has an effect on how the fuel is delivered into and ignited in the combustor during a re-light procedure (for example, droplet size from fuel spray nozzles, which may impact how the fuel will be ignited). The aromatic content of the fuel must therefore be taken into account when delivering fuel to fuel spray nozzles of the combustor during a re-light procedure.

The method may comprise providing fuel to the combustor having an aromatic content of 5% or lower by volume.

The method may comprise providing fuel to the combustor having an aromatic content of 1% or lower by volume.

The fuel provided to the combustor may have a calorific value of at least 43.5 MJ/kg, preferably between 43.5 MJ/kg and 44 MJ/kg, or at least 43.8 MJ/kg and preferably between 43.8 MJ/kg and 44 MJ/kg.

The gas turbine engine may comprise a fuel-oil heat exchanger. The method may comprise transferring heat from oil to the fuel before the fuel enters the combustor so as to lower the fuel viscosity to 0.58 $mm^2/s$ or lower on entry to the combustor at cruise conditions, preferably 0.48 $mm^2/s$ or lower, preferably between 0.40 $mm^2/s$ and 0.48 $mm^2/s$ and preferably between 0.42 $mm^2/s$ and 0.44 $mm^2/s$.

According to a fourth aspect there is provided a gas turbine engine for an aircraft. The gas turbine engine comprises a staged combustor in which fuel is combusted. The combustor comprises an arrangement of fuel spray nozzles and one or more ignitors. The gas turbine engine comprises a controller configured to bias fuel flow to a subset of the fuel spray nozzles adjacent the one or more ignitors during a re-light procedure, the fuel having an aromatic content of 10% or lower by volume.

The fuel may have an aromatic content of 5% or lower by volume.

The fuel may have an aromatic content of 1% or lower by volume.

The fuel provided to the combustor may have a calorific value of at least 43.5 MJ/kg, preferably between 43.5 MJ/kg and 44 MJ/kg, or at least 43.8 MJ/kg and preferably between 43.8 MJ/kg and 44 MJ/kg.

The gas turbine engine may comprise a fuel-oil heat exchanger. The controller may be arranged to transfer heat from oil to the fuel before the fuel enters the combustor so as to lower the fuel viscosity to 0.58 mm$^2$/s or lower on entry to the combustor at cruise conditions, preferably 0.48 mm$^2$/s or lower, preferably between 0.40 mm$^2$/s and 0.48 mm$^2$/s and preferably between 0.42 mm$^2$/s and 0.44 mm$^2$/s.

According to a fifth aspect there is provided a method of operating a gas turbine engine. The gas turbine engine comprises a staged combustor in which fuel is combusted. The combustor comprises an arrangement of fuel spray nozzles in which fuel flow is biased to a subset of the fuel spray nozzles adjacent one or more ignitors during a re-light procedure. The method comprises transferring heat from oil to the fuel before the fuel enters the combustor so as to lower the fuel viscosity to 0.58 mm$^2$/s or lower on entry to the combustor at cruise conditions.

The inventors have appreciated that fuel viscosity has an effect on how the fuel is delivered into and ignited in the combustor (for example, droplet size from fuel spray nozzles, which may impact atomisation and burn efficiency) during cruise and/or during a re-light procedure (which may occur most frequently during cruise). Taking the fuel viscosity into account when delivering fuel to the combustor, and controlling it as appropriate by varying heat input to the fuel, may therefore provide more efficient fuel burn, improving aircraft performance. A lower viscosity of the fuel at cruise may lend itself to a more efficient engine and easier re-light during a re-light procedure. In addition to more efficient fuel burn, a lower fuel viscosity may improve pump performance and may also improve pump longevity. The fuel viscosity must therefore be taken into account when delivering fuel to fuel spray nozzles of the combustor during cruise and/or during a re-light procedure.

The method may comprise transferring heat from the oil to the fuel before the fuel enters the combustor so as to lower the fuel viscosity to between 0.58 mm$^2$/s and 0.30 mm$^2$/s on entry to the combustor at cruise conditions.

The method may comprise transferring heat from the oil to the fuel before the fuel enters the combustor so as to lower the fuel viscosity to 0.48 mm$^2$/s or lower on entry to the combustor at cruise conditions.

The method may comprise transferring heat from the oil to the fuel before the fuel enters the combustor so as to lower the fuel viscosity to between 0.50 mm$^2$/s and 0.35 mm$^2$/s, or between 0.48 mm$^2$/s and 0.40 mm$^2$/s, or between 0.44 mm$^2$/s and 0.42 mm$^2$/s on entry to the combustor at cruise conditions.

The method may comprise transferring heat from the oil to the fuel before the fuel enters the combustor so as to lower the fuel viscosity to 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s or lower on entry to the combustor at cruise conditions. The method may comprise transferring heat from the oil to the fuel before the fuel enters the combustor so as to lower the fuel viscosity so that it is with a range defined between any two of the values in the previous sentence.

The gas turbine engine may comprise a fuel-oil heat exchanger.

The fuel provided to the combustor may have a calorific value of at least 43.5 MJ/kg, preferably between 43.5 MJ/kg and 44 MJ/kg, or at least 43.8 MJ/kg and preferably between 43.8 MJ/kg and 44 MJ/kg.

The fuel provided to the combustor may have an aromatic content of 10% or lower by volume, preferably 5% or lower and further preferably 1% or lower.

According to a sixth aspect there is provided a gas turbine engine for an aircraft. The gas turbine engine comprises a staged combustor in which fuel is combusted. The combustor comprises an arrangement of fuel spray nozzles and one or more ignitors. The gas turbine engine comprises a fuel-oil heat exchanger. The gas turbine engine comprises a controller. The controller is configured to bias fuel flow to a subset of the fuel spray nozzles adjacent the one or more ignitors during a re-light procedure. The controller is configured to control operation of the fuel-oil heat exchanger to transfer heat from the oil to the fuel so as to lower the fuel viscosity to 0.58 mm$^2$/s or lower on entry to the combustor at cruise conditions.

The controller may be configured to control operation of the fuel-oil heat exchanger to transfer heat from the oil to the fuel before the fuel enters the combustor so as to lower the fuel viscosity to between 0.58 mm$^2$/s and 0.30 mm$^2$/s on entry to the combustor at cruise conditions.

The controller may be configured to control operation of the fuel-oil heat exchanger to transfer heat from the oil to the fuel before the fuel enters the combustor so as to lower the fuel viscosity to 0.48 mm$^2$/s or lower on entry to the combustor at cruise conditions.

The controller may be configured to control operation of the fuel-oil heat exchanger to transfer heat from the oil to the fuel before the fuel enters the combustor so as to lower the fuel viscosity to between 0.50 mm$^2$/s and 0.35 mm$^2$/s, or between 0.48 mm$^2$/s and 0.40 mm$^2$/s, or between 0.44 mm$^2$/s and 0.42 mm$^2$/s on entry to the combustor at cruise conditions.

The controller may be configured to control operation of the fuel-oil heat exchanger to transfer heat from the oil to the fuel before the fuel enters the combustor so as to lower the fuel viscosity to 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s or lower on entry to the combustor at cruise conditions. The controller may be configured to control operation of the fuel-oil heat exchanger to transfer heat from the oil to the fuel before the fuel enters to the combustor so as to lower the fuel viscosity so that it is with a range defined between any two of the values in the previous sentence.

The fuel provided to the combustor may have a calorific value of at least 43.5 MJ/kg, preferably between 43.5 MJ/kg and 44 MJ/kg, or at least 43.8 MJ/kg and preferably between 43.8 MJ/kg and 44 MJ/kg.

The fuel provided to the combustor may have an aromatic content of 10% or lower by volume, preferably 5% or lower and further preferably 1% or lower.

The features of the following statements may apply to any of the above aspects:

In any of the above aspects, the number of fuel spray nozzles may be between 14 and 22 and/or or a number of fuel spray nozzles per unit engine core size in the range 2 to 6.

The (total) number of fuel spray nozzles may be between 16 and 20.

The number of fuel spray nozzles may be 14, 15, 16, 17, 18, 19, 20, 21, 22, or a number within a range defined between any two of the values in this sentence.

The number of fuel spray nozzles per unit engine core size may be in the range 2.5 to 4.5, and more preferably in the range 3 to 4.

The number of fuel spray nozzles per unit engine core size may be 2, 3, 4, 5, 6, or within a range defined between any two of those values, and more preferably 2.5, 3, 3.5, 4, or 4.5, or within a range defined between any two of those values, and even more preferably 3.0, 3.1, 3.2, 3.3, 3.4, 3.5, 3.6, 3.7, 3.8, 3.9, or 4.0, or within a range defined between any two of those values.

The number of fuel spray nozzles per unit engine core size may be 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0, or within a range defined between any two of those values.

The engine core size may be in the range 4 to 7, and more preferably in the range 5 to 6, and even more preferably in the range 5.2 to 5.5.

Unless otherwise stated, all references to the "core size" herein are in units of $s.K^{1/2}.in$ and all references to the "number of fuel spray nozzles per unit engine core size" is the number of nozzles per unit engine core size also in $s.K^{1/2}.in$.

In any of the above aspects, the subset of fuel spray nozzles may comprise at least one half of the total number of fuel spray nozzles.

In any of the above aspects, the subset of fuel spray nozzles may comprise at least two thirds of the total number of fuel spray nozzles.

In any of the above aspects, the arrangement of fuel spray nozzles may comprise duplex nozzles and single flow nozzles.

In any of the above aspects, the subset of fuel spray nozzles may comprise the duplex nozzles and the remaining fuel spray nozzles may comprise the single flow nozzles. The subset of fuel spray nozzles may be a first subset of fuel spray nozzles and comprises the duplex nozzles and the arrangement of fuel spray nozzles may comprise a second subset of fuel spray nozzles comprising the single flow nozzles.

The combustor may have 10-14 duplex fuel spray nozzles and 4-8 single flow fuel spray nozzles.

The duplex fuel spray nozzles may be arranged in groups about the circumference of the combustor.

The groups of duplex fuel spray nozzles may comprise at least two groups arranged diametrically opposite each other.

Each group of duplex fuel spray nozzles may comprise 2-8 nozzles.

In any of the above aspects, the combustor may comprise at least two ignitors and the subset of fuel spray nozzles may comprise at least two groups of nozzles. Each group of nozzles may be adjacent one of the ignitors.

In any of the above aspects, the gas turbine engine may comprise a plurality of ignitors. The plurality of ignitors may be disposed symmetrically about a circumference of the combustor. Pairs of ignitors may be disposed diametrically opposite one another about a circumference of the combustor.

Each ignitor may be arranged adjacent to one or more of the duplex fuel spray nozzles.

Each ignitor may be arranged adjacent to one of the groups of duplex fuel spray nozzles.

The combustor may comprise 1-8 ignitors.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 KN, 155 kN, 160 kN, 170 KN, 180 kN, 190 KN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

As used herein, a range "from value X to value Y" or "between value X and value Y", or the likes, denotes an inclusive range; including the bounding values of X and Y.

BRIEF DESCRIPTION OF THE DRAWINGS

Embodiments will now be described by way of example only, with reference to the Figures, in which.

DETAILED DESCRIPTION OF THE DISCLOSURE

Figure 1:
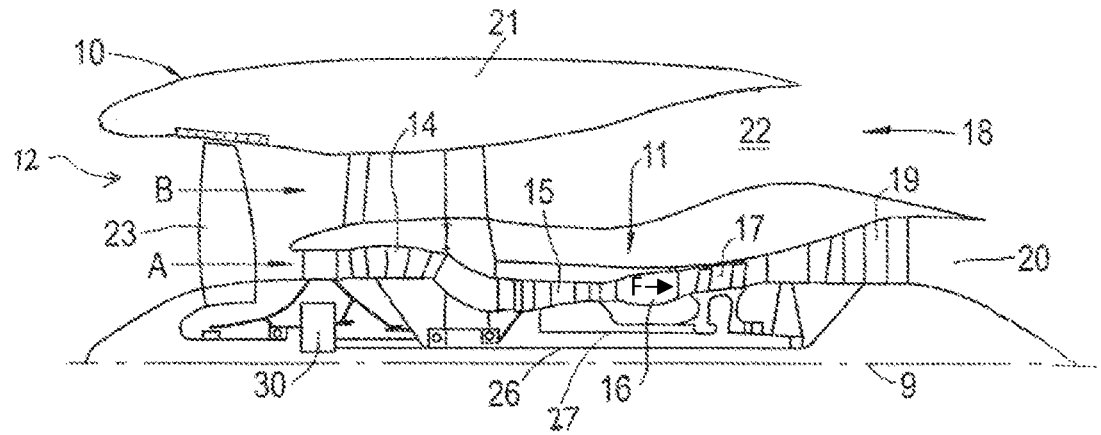
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
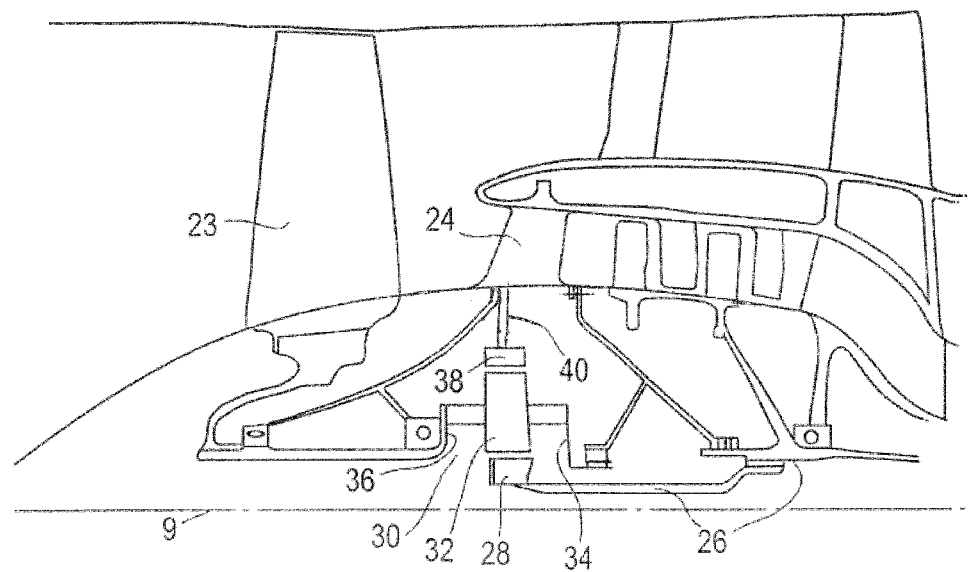
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
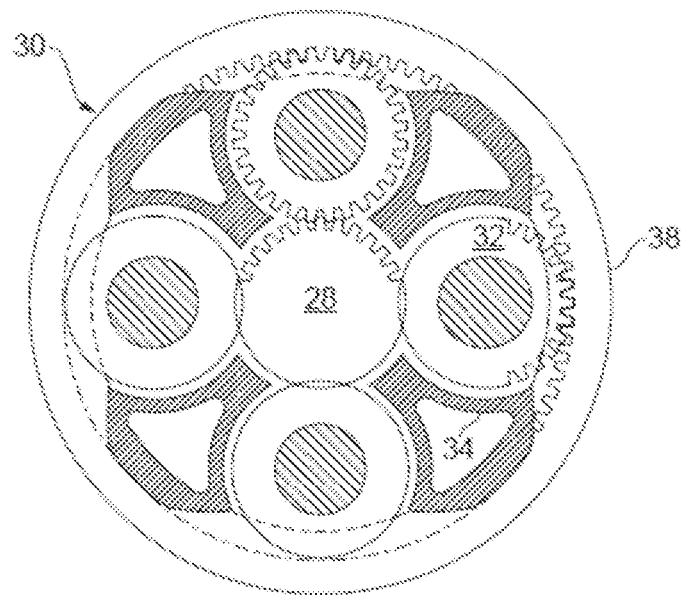
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (C) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 4:
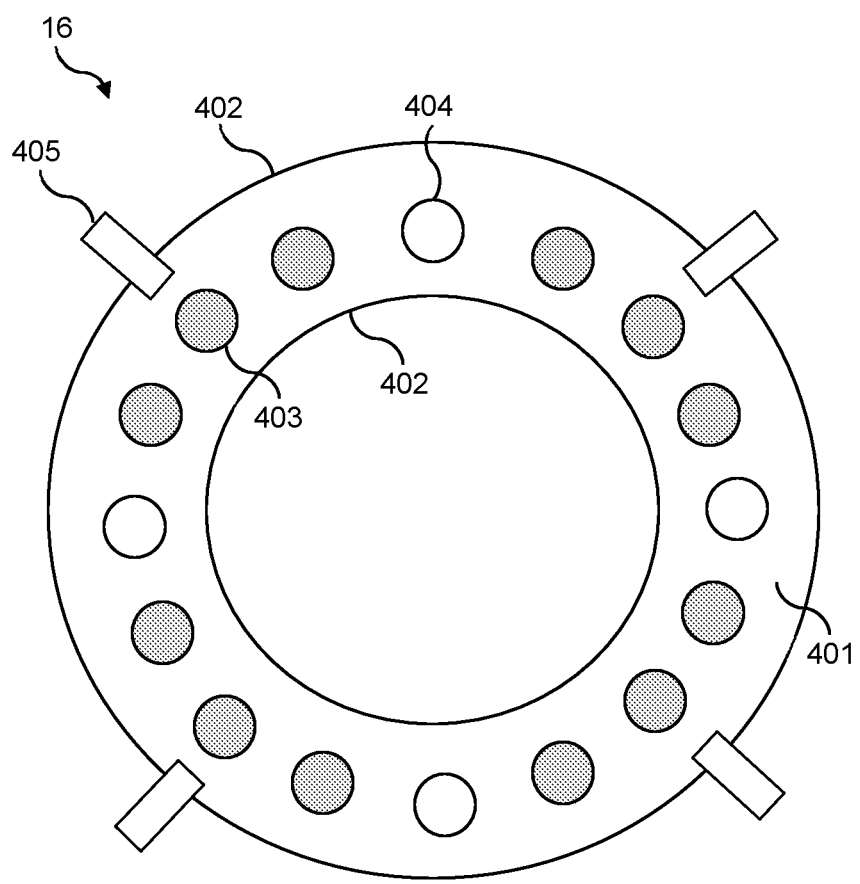
FIG. 4 is a sectional view through a combustor of the engine of FIG. 1 in a plane normal to the principal rotational axis of the engine.

FIG. 4 shows a section through the combustor 16 of the engine 10 of FIG. 1 in a plane normal to the principal rotational axis 9 of the engine 10. The combustor 16 comprises an annular combustion chamber 401, defined by a liner 402. Alternative combustor configurations may be used in other examples, for example cannular, canned, etc. The combustor 16 comprises a plurality of fuel spray nozzles 403, 404 arranged about the circumference of the combustor 16. Each fuel spray nozzle 403, 404 comprises one or more fuel injectors arranged to inject fuel into the combustion chamber 401. In this example, the combustor 16 comprises 16 fuel spray nozzles 403, 404. In other examples, the combustor 16 may comprise any suitable number of fuel spray nozzles 403, 404, for example a number of fuel spray nozzles in the range 14 to 22. In some examples, the number of fuel spray nozzles 403, 404 may be between 16 and 20. In yet other examples, the number of fuel spray nozzles may be 14, 15, 16, 17, 18, 19, 20, 21, 22, or a number within a range defined between any two of the values in this sentence.

The core size defines the size of the core 11 of the engine 10. Engine core size can be defined as:

$$\text{Core size} = \dot{m}_2 \frac{\sqrt{T_3}}{P_3}$$

Where $\dot{m}_2$=the mass flow rate, in lbs per second, of air on entry to the high pressure compressor 15, $T_3$=the temperature, in Kelvin, of air on exit from the high pressure compressor 15, and $P_3$=the pressure, in lb inches per second squared per inch squared, of air on exit from the high pressure compressor 15. A unit of core size is therefore expressed as:

$$s \cdot K^{\frac{1}{2}} \cdot in$$

The core size (in $s.K^{1/2}.in$) of the engine may be between 4 and 7, for example 4, 4.5, 5, 5.5, 6, 6.5, or 7, or any range defined between any two of these values. In some examples, the engine core size (in $s.K^{1/2}.in$) may be in the range of 5.0, 5.1, 5.2, 5.3, 5.4, 5.5, 5.6, 5.6, 5.7, 5.8, 5.9, or 6, or any range defined between any two of these values. In yet further examples, the engine core size (in $s.K^{1/2}.in$) may be in the range of 5.25, 5.26, 5.27, 5.28, 5.29, 5.30, 5.31, 5.32, 5.33, 5.34, 5.35, 5.36, 5.37, 5.38, 5.39, 5.40, 5.41, 5.42, 5.43, 5.44, or 5.45, or any range defined between any two of these values.

The number of fuel spray nozzles per unit engine core size (in the units given above) may be in the range of 2 to 6, for example, 2, 3, 4, 5, 6, or within a range defined between any two of those values. In some preferred examples, the number of fuel spray nozzles per unit engine core size may be in the range of 2.5 to 4.5, for example 2.5, 3, 3.5, 4, or 4.5, or any range defined between any two of these values. In yet further examples, the number of fuel spray nozzles per unit engine core size may be in the range of 3 to 4, for example 3.0, 3.1, 3.2, 3.3, 3.4, 3.5, 3.6, 3.7, 3.8, 3.9, or 4.0, or any range defined between any two of these values. In yet further examples, the number of fuel spray nozzles per unit engine core size may be 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0, or within a range defined between any two of those values.

The core size is defined herein at an engine operation condition corresponding to a maximum value of the semi-non-dimensional flow at high pressure compressor entry, defined as:

$$\dot{m}_2 \frac{\sqrt{T_2}}{P_2}$$

where $\dot{m}_2$ is the mass flow rate (in lbs per second) of air on entry to the high pressure compressor, $T_2$ is the temperature (in Kelvin) of air on entry to the high pressure compressor, and $P_2$ is the pressure (in lb inches per second squared per inch squared) of air on entry to the high pressure compressor.

The operating condition corresponding to the maximum semi-non-dimensional flow at high pressure compressor entry may be the top of climb operating condition. The core size referred to herein may therefore be defined at the top of climb operating condition. The top of climb may be as defined in the art and as understood by the skilled person for a specific implementation of a gas turbine of the present application. In one specific example, the top of climb may correspond to operating at an altitude of between 30,000 ft to 39,000 ft (more specifically 35,000 ft), a forward speed of Mach Number 0.75 to 0.85, and ambient air temperature (DTAMB) of ISA+10K to ISA+15 K.

The combustor 16 comprises a number of duplex fuel spray nozzles 403 (also known as internally-staged nozzles) in which a primary fuel injector is integrated in the same fuel nozzle as a main fuel injector. The combustor 16 also comprises a number of single flow fuel spray nozzles 404 which each comprise a main fuel injector only. In other examples, the combustor 16 may comprise only duplex fuel spray nozzles or only single flow fuel spray nozzles.

In this example, the combustor 16 comprises 12 duplex fuel spray nozzles 403 and 4 single flow fuel spray nozzles 404. The duplex fuel spray nozzles 403 are illustrated in FIG. 4 by shaded circles. The duplex fuel spray nozzles 403 are arranged in groups of three about the circumference of the combustor 16, with each group being arranged diametrically opposite another of the groups. In other examples, the combustor 16 may comprise any suitable number of duplex fuel spray nozzles, for example in the range of 10-14 nozzles, and any suitable number of single flow fuel spray nozzles, for example in the range of 4-8 nozzles. In some examples, the number of duplex fuel spray nozzles may be 10, 11, 12, 13 or 14, or within a range defined between any two of the values in this sentence. In some examples, the number of single flow fuel spray nozzles may be 4, 5, 6, 7 or 8, or within a range defined between any two of the values in this sentence. The duplex fuel spray nozzles may be arranged in any suitable number of groups, or may not be arranged in groups. Where applicable, each group of duplex fuel spray nozzles may comprise any suitable number of nozzles, for example in the range of 2 to 8 nozzles. In some examples, each group of duplex nozzles may comprise 2, 3, 4, 5, 6, 7 or 8 fuel spray nozzles, or a number within a range defined between any two of those values. The arrangement of nozzles shown in FIG. 4 may be all of the fuel spray nozzles provided in the combustor 16. In other examples, further fuel spray nozzles may be provided in the combustor 16 in addition to those described.

The combustor 16 further comprises four ignitors 405 arranged to ignite an air-fuel mixture in the combustion chamber 401 in operation. Each ignitor 405 is arranged adjacent to one of the groups of duplex fuel spray nozzles 403. The duplex nozzles 403 are therefore each located closer to a respective ignitor (e.g. its nearest ignitor) compared to the single flow nozzles 404. Each ignitor 405 is arranged diametrically opposite another of the ignitors 405. In other examples, the combustor may comprise fewer or more ignitors, for example a number of ignitors in the range 1-8, and the ignitors may be arranged differently. For example, one or more of the ignitors may not be arranged adjacent to one of the groups of duplex fuel spray nozzles and one or more of the ignitors may not be arranged diametrically opposite another of the ignitors. In some examples, the combustor may comprise 1, 2, 3, 4, 5, 6, 7 or 8 ignitors, or a number within a range defined between any two of the values in this sentence.

In the example shown, when the engine 10 is operating at low power (below a staging point), for example during or shortly after re-light or start-up, fuel is supplied only to the primary injectors of the duplex fuel spray nozzles 403 for delivery to the combustion chamber 401. A greater fuel flow rate is therefore provided to the duplex nozzles 403 compared to the single flow nozzles 404 below the staging point. As the power output of the engine 10 and the mass flow of air through engine 10 increases, the staging point is reached at which fuel is additionally supplied to the main fuel injectors of one or more of the duplex fuel spray nozzles 403 and to the main fuel injectors of one or more of the single flow fuel spray nozzles 404 for delivery to the combustion chamber 401. In the present example, at higher power levels, fuel is injected by all main injectors of both the duplex fuel spray nozzles 403 and the single flow fuel spray nozzles 404, in addition to fuel injected by the primary injectors of the duplex fuel spray nozzles 403. In this example, the flow rate of fuel supplied to the main injectors of the single flow fuel spray nozzles 404 is less than or equal to the flow rate of fuel supplied to the main injectors of the duplex fuel spray nozzles 403. Therefore, because both the primary and main injectors of the duplex fuel spray nozzles 403 are receiving fuel, the duplex fuel spray nozzles 403 receive more fuel than the single flow fuel spray nozzles 404 at and above the staging point. In an alternative example, fuel is supplied only to the main fuel injectors of one or more of the one or more duplex fuel spray nozzles 403 and to the main fuel injectors of one or more of the single flow fuel spray nozzles 404 at and above the staging point, i.e., fuel is not supplied to the primary injectors of the duplex fuel spray nozzles 403.

Fuel flow delivered to the plurality of fuel spray nozzles is therefore biased to a subset of the fuel spray nozzles adjacent the ignitors. For example, fuel flow is biased such that the fuel flow rate to a first subset of the plurality of fuel spray nozzles (the duplex fuel spray nozzles 403 in the present example) is greater than that delivered to a second subset of the fuel spray nozzles (the single flow fuel spray nozzles 404 in the present example). This may allow a primary fuel flow to be provided to fuel spray nozzles which are located relatively closer to the ignitors 405 to aid ignition and flame stability at low engine powers, engine start-up, or during an engine re-light. In some examples, the first subset (e.g. the duplex nozzles) of fuel spray nozzles may comprise at least one half, preferably at least two thirds, of the total number of fuel spray nozzles.

In other examples, the rate of fuel flow to each fuel spray nozzle provided in the combustor may be the same and there may be no biasing of the fuel flow to a subset of the nozzles. In such an example, all of the fuel flow nozzles may be single flow nozzles or they may all be duplex nozzles. In yet other examples, other arrangements of fuel spray nozzles may be provided in which fuel is biased to those adjacent, or closer, to the ignitors. For example, two subsets (that are independently controllable) of duplex nozzles or two subsets of single flow nozzles may be provided which can be biased as described above.

Figure 5:
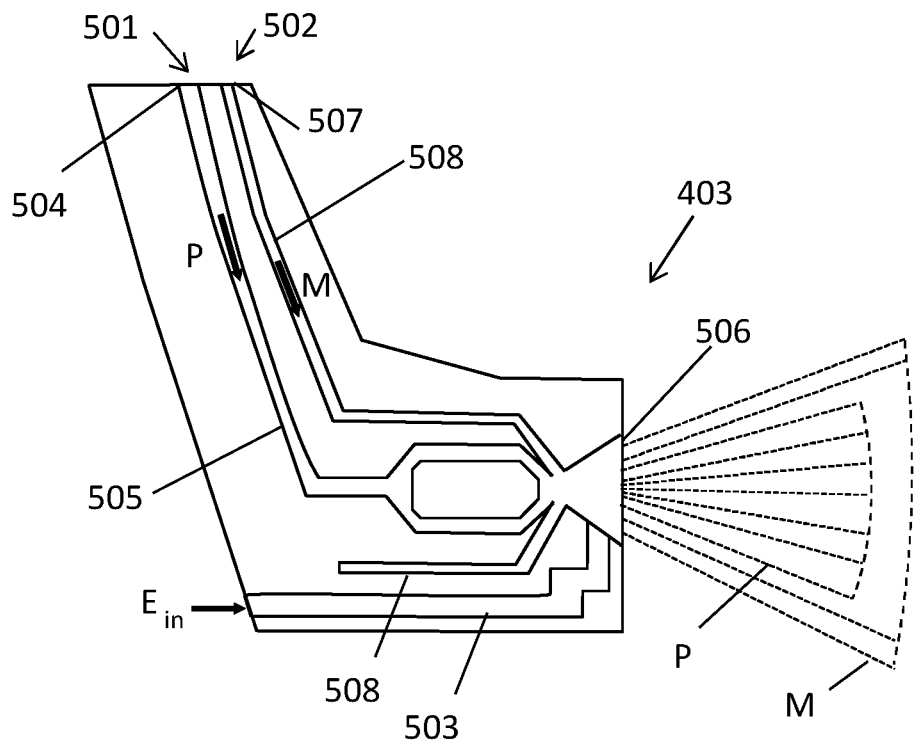
FIG. 5 is a schematic cross-section of a duplex fuel spray nozzle of the combustor of FIG. 4.

FIG. 5 shows one of the duplex fuel spray nozzles 403 of the combustor 16.

The duplex nozzle 403 comprises a primary fuel injector 501, a main fuel injector 502 and an air duct 503. The primary injector 501 comprises a primary inlet 504 arranged to receive a primary flow of fuel P and a primary fuel circuit 505 arranged to deliver the primary flow of fuel to the outlet 506 of the nozzle 403. The main injector 502 comprises a main inlet 507 arranged to receive a main flow of fuel M and a main fuel circuit 508 arranged to deliver the main flow of fuel to the outlet 506 of the nozzle 403. The air duct 503 receives high pressure air from the high pressure compressor 15 and delivers the high pressure air to the outlet 506 of the nozzle 403.

The duplex nozzle 403 is configured to produce, at the outlet 506 of the nozzle 403, a primary cone of fuel from the primary injector 501 and a main cone of fuel from the main injector 502 (illustrated in FIG. 5 by the dashed lines labelled P and M respectively). When both the primary and main injectors 501, 502 are active, the primary and main cones are arranged concentrically, with the main cone arranged annularly outside of the primary cone. Those skilled in the art will be familiar with such fuel spray patterns.

It will be appreciated that the duplex nozzle 403 of FIG. 5 is merely exemplary and that other examples may utilise an alternative configuration of duplex nozzle.

Figure 6:
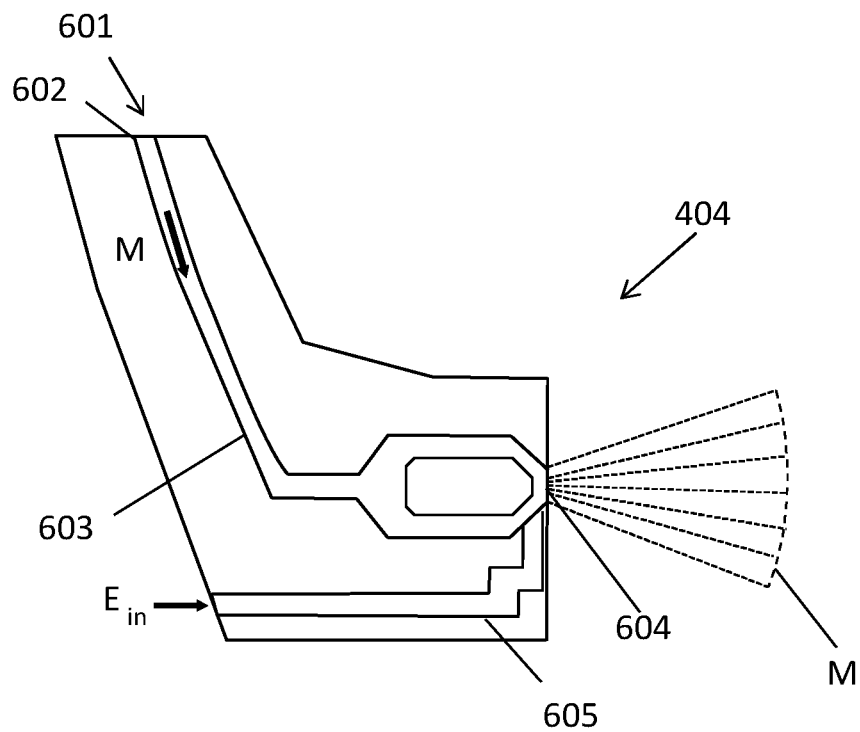
FIG. 6 is a schematic cross-section of a single flow fuel spray nozzle of the combustor of FIG. 4.

FIG. 6 shows one of the single flow fuel spray nozzles 404 of the combustor 16. The nozzle 404 comprises a main fuel injector 601, comprising a main inlet 602 arranged to receive a main flow of fuel M and a main fuel circuit 603 arranged to deliver the main flow of fuel to the outlet 604 of the nozzle 404. The nozzle 404 is configured to produce a main cone of fuel at the outlet 604 of the nozzle 404 (shown by the dashed lines labelled M). Air is similarly supped to the outlet 604 of the nozzle by an air duct 605.

It will be appreciated that the single flow fuel spray 404 of FIG. 6 is merely exemplary and that other examples may utilise an alternative configuration of single flow fuel spray nozzle 404.

Figure 7:
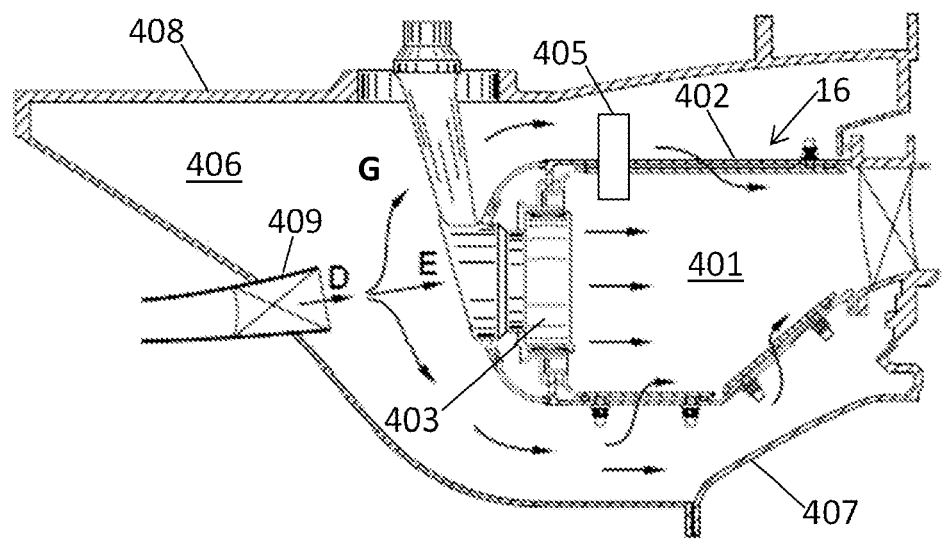
FIG. 7 is a partial sectional view of the engine of FIG. 1.
Figure 8:
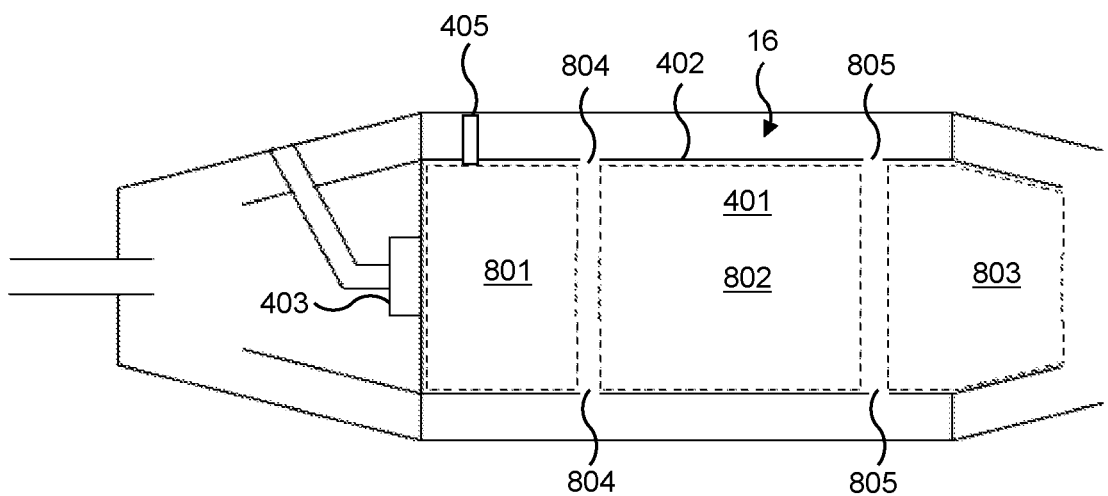
FIG. 8 is a further partial sectional view of the engine of FIG. 1.

FIGS. 7 and 8 each show a section through the engine 10, perpendicular to the principal rotational axis 9, including a portion of the combustor 16 comprising one of the duplex fuel spray nozzles 403 and one of the ignitors 405. A similar arrangement is provided at the location of the single flow fuel spray nozzles 404 as for the duplex nozzles 403. The combustor 16 is mounted within a cavity 406 formed by an inner air casing 407 and outer air casing 408. In operation, the high pressure compressor 15 delivers high pressure air D to the cavity 406 via a diffuser 409. At this point, a quantity of the air enters the combustor 16 as combustion air E through the fuel nozzle 403 and/or mixing ports at the entrance to the combustor 16. The remaining air flows around the combustor 16 as cooling air G, some of which is admitted downstream of the fuel nozzle 403 as described below with reference to FIG. 8.

One or more temperature and/or pressure probes (not shown) may be installed in the casing of the diffuser 409 and arranged to measure the temperature and/or pressure of the high pressure air D delivered to the cavity 406 from the high pressure compressor 15 via the diffuser 409 (i.e. the temperature and pressure at the high-pressor compressor 15 exit). Such a temperature probe may be referred to as a $T_3$ probe and such a pressure probe may be referred to as a $P_3$ probe. It will be appreciated that the engine 10 may comprise any suitable arrangement of pressure and temperature probes which may be positioned at any suitable location within the engine 10. As used herein, $T_3$ and $P_3$, and any other numbered pressures and temperatures, may be defined using the station numbering listed in standard SAE AS755.

The combustor 16 operates as a rich burn, quick quench, lean burn (RQL) combustor. In other examples, the combustor 16 may be an alternative type of combustor, such as a standard rich-burn combustor (with no fuel flow biasing). Referring to FIG. 8, the combustion chamber 401 of the RQL combustor 16 is divided into three zones along the length of the combustor 16: a rich zone 801, a quick quench zone 802, and a lean zone 803. In operation, a rich air-fuel mixture is introduced into the rich zone 801 from the fuel spray nozzle 403 where it is ignited by the ignitor 405. Within the rich zone 801 fuel is burnt at a fuel/air ratio higher than stoichiometric (for example, at an equivalence ratio of about 1.8). Air is then introduced to the combustion products, via primary ports 804 arranged in the liner 402 of the combustor 16, before the combustion products reach the quick quench zone 802. Further air is added to the still burning fuel via the primary ports 804 (which may be referred to as quench ports). Air is added by the primary ports 804 at a higher rate (e.g. higher than within the rich zone) thereby quenching the combustion to a significantly lower than stoichiometric fuel/air ratio (for example, at an equivalence ratio of between 0.5 and 0.7), while continuing to allow the fuel to burn. Consequently, very little of the combustion process may be carried out at close to stoichiometric fuel/air ratios, and so relatively little nitrogen oxides (NOx) is produced. Air is then again introduced to the combustion products, via secondary ports 805 arranged in the liner 402 of the combustor 16, while the combustion products are in the lean zone 803 (or just before they reach the lean zone 803). Within the lean zone 803, fuel is burnt at a fuel/air ratio lower than stoichiometric (for example, at an equivalence ratio of between 0.5 and 0.7). After passing through the lean zone 803, the combustion products exit the combustor 16. The secondary ports 805 may be referred to as dilution ports, and may be arranged to gradually introduce dilution air into the lean zone 803. Fuel added by the fuel spray nozzle is substantially completely burnt by the time the air exits at an outlet of the combustor, prior to flowing to the turbine.

Figure 9:
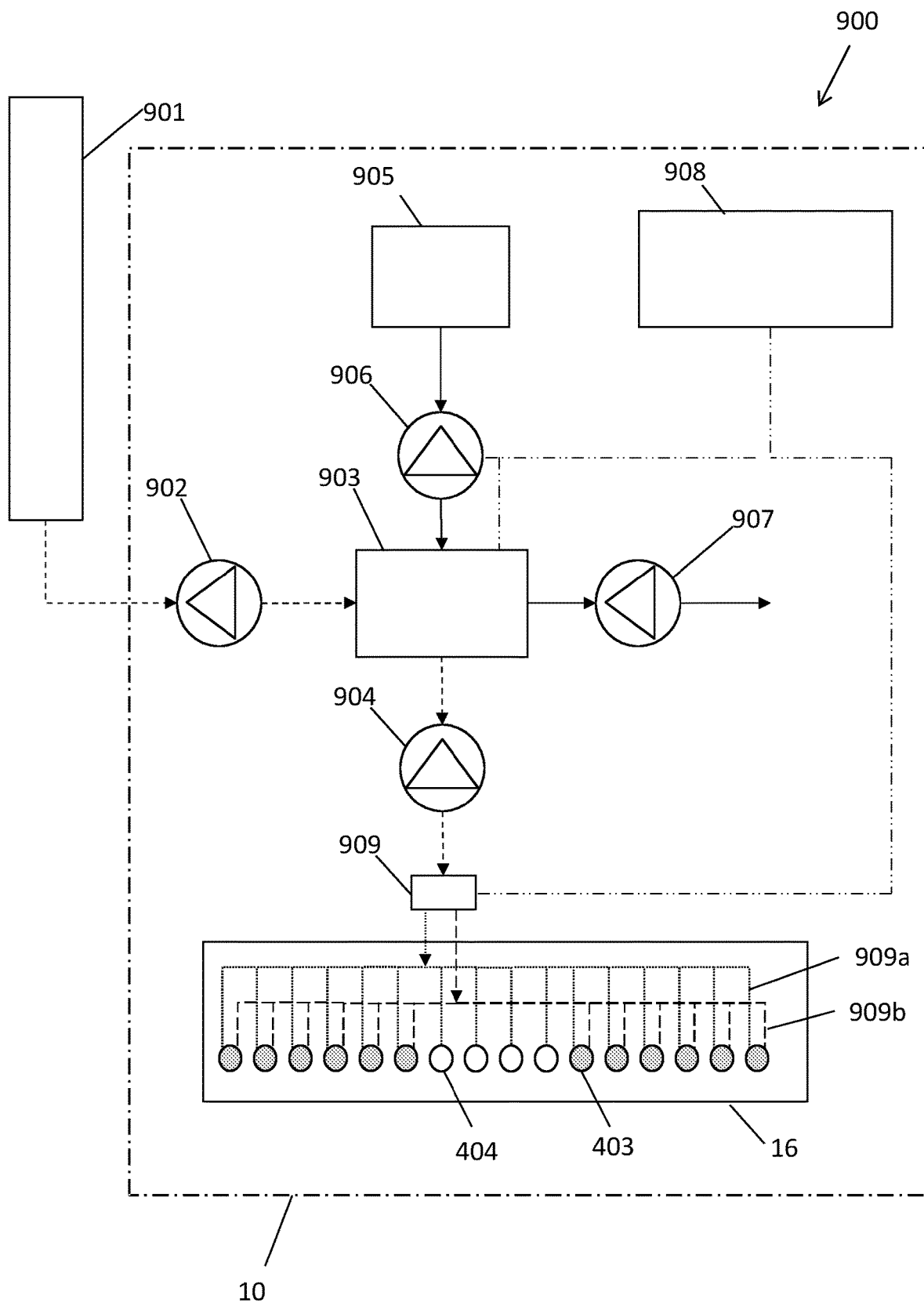
FIG. 9 is a schematic representation of a propulsion system for an aircraft comprising the engine of FIG. 1.

FIG. 9 shows a portion of a propulsion system 900 for an aircraft. The propulsion system 900 comprises the gas turbine engine 10 of FIG. 1. The engine 10 further comprises a fuel system and an oil system. The fuel system comprises: a low pressure fuel pump 902, a fuel-oil heat exchanger 903, a main (or high pressure) fuel pump 904, a controller 908, and a fuel distributing valve 909. The propulsion system 900 further comprises a fuel tank 901. The oil system comprises an oil tank 905, an oil feed pump 906, and a main oil pump 907. In the present example, the low pressure fuel pump 902 is shown forming part of the gas turbine engine 10. In other examples, the low pressure fuel pump, or additional fuel pumps, may be provided as part of the fuel system on board the aircraft to which the gas turbine engine is mounted.

The low pressure fuel pump 902 is arranged to deliver fuel from the fuel tank 901 to the fuel-oil heat exchanger 903 via a suitable arrangement of pipes, conduits etc. (not shown). The main fuel pump 904 is configured to deliver fuel from the fuel-oil heat exchanger 903 to the fuel spray nozzles of the combustor 16 via the fuel distributing valve 909 and a suitable arrangement of pipes, conduits etc. (not shown). The fuel distributing valve 909 is arranged to distribute fuel between a main manifold 909a and a primary manifold 909b. The main manifold is fluidly connected to the main injectors of each of the fuel spray nozzles 404, 403 as shown in FIG. 9. It therefore provides fuel to all of the duplex 403 and single flow 404 fuel spray nozzles. The primary manifold 909b is fluidly connected to the primary injectors of each of the duplex fuel spray nozzles 403. The primary manifold 909b can therefore be used to provide a greater flow rate of fuel to the first subset of fuel spray nozzles (e.g. the duplex fuel spray nozzles 403 in the present example) compared to the flow rate of fuel provided to the second subset of flow spray nozzles via the main manifold 909a. For example, below a threshold engine power, fuel may be supped only (or at a greater fuel flow rate) to the first subset of fuel spray nozzles via the primary manifold 909b compared to the second subset of fuel spray nozzles.

The oil feed pump 906 is arranged to deliver lubricating oil from the oil tank 905 to the fuel-oil heat exchanger 903 via a suitable arrangement of pipes, conduits etc. (not shown). The main oil pump 907 is arranged to deliver oil from the fuel-oil heat exchanger 903 to components of the engine 10 as required via a suitable oil distribution arrangement (not shown). The flow path of fuel from the fuel tank 901 to the combustor 16, via the pumps 902, 904 and the fuel-oil heat exchanger 903, in operation is illustrated in FIG. 9 by dashed arrows. The flow path of oil from the oil tank 905 to the fuel-oil heat exchanger 903, via the oil feed pump 906, and on to components of the engine 10 in operation is illustrated in FIG. 9 by solid arrows.

The controller 908 comprises a suitable arrangement of processors and electronic memory. The controller 908 is in communication with fuel-oil heat exchanger 903, as illustrated by the dashed and dotted line in FIG. 9, and is configured to control operation of the fuel-oil heat exchanger 903. The controller 908 is configured to control operation of the fuel-oil heat exchanger 903 by providing control signals to the fuel-oil heat exchanger 903. The controller 908 is configured to control operation of the fuel-oil heat exchanger 903 to adjust at least one property or parameter of the fuel on entry to the combustor 16. In the example shown, the controller 908 is configured to control operation of the fuel-oil heat exchanger 903 to control a viscosity of the fuel on entry to the combustor 16. In other examples, the controller 908 may additionally or alternatively be configured to control operation of the fuel-oil heat exchanger 903 to control a temperature of the fuel on entry to the combustor. The controller 908 may be a separate controller as illustrated, or may form part of an Engine Electronic Controller (EEC) arranged to control other engine functions.

In the example shown, the fuel-oil heat exchanger 903 is disposed between the low pressure-fuel pump 902 and the main fuel pump 904, although the fuel-oil heat exchanger 903 may be disposed at any suitable location or position relative to the other components of the propulsion system 900. In other examples, the propulsion system 900 may comprise one or more further heat exchangers arranged to receive oil from the oil system, or the propulsion system 900 may comprise one or more further oil systems arranged to supply oil to the one or more further heat exchangers. It will be appreciated that the propulsion system 900 as shown in FIG. 9 is merely a schematic view of an illustrative propulsion system.

In one example, the controller 908 is configured to control operation of the fuel-oil heat exchanger 903 to lower the fuel viscosity to 0.58 mm$^2$/s or lower on entry to the combustor 16 at cruise conditions. The controller 908 may alternatively be configured to control operation of the fuel-oil heat exchanger 903 to lower the fuel viscosity to 0.48 mm$^2$/s or lower on entry to the combustor at cruise conditions.

Alternatively, the controller 908 may be configured to control operation of the fuel-oil heat exchanger 903 to lower the fuel viscosity to between 0.58 mm$^2$/s and 0.30 mm$^2$/s, for example 0.58, 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s on entry to the combustor 16 at cruise conditions. The controller 908 may be configured to control operation of the fuel-oil heat exchanger 903 to lower the fuel viscosity to between 0.54 mm$^2$/s and 0.34 mm$^2$/s, 0.50 mm$^2$/s and 0.38 mm$^2$/s, 0.50 mm$^2$/s and 0.35 mm$^2$/s, or preferably between 0.48 mm$^2$/s and 0.40 mm$^2$/s, or between 0.44 mm$^2$/s and 0.42 mm$^2$/s on entry to the combustor at cruise conditions. Alternatively, the controller 908 may be configured to control operation of the fuel-oil heat exchanger 903 to lower the fuel viscosity to 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s or lower on entry to the combustor 16 at cruise conditions. The controller 908 may be configured to control operation of the fuel-oil heat exchanger 903 to lower the fuel viscosity so that it is in a range defined between any two of the values in the previous sentence.

The fuel viscosities described above may be suitable for operation of the gas turbine engine 10 with a sustainable aviation fuel. The fuel system may therefore be arranged to supply the combustor 16 with a sustainable aviation fuel, e.g. by storing sustainable aviation fuel within the fuel tank 901. The sustainable aviation fuel (SAF) may be as defined anywhere herein. In any aspect of the present disclosure, the fuel provided to the plurality of fuel spray nozzles may comprise a sustainable aviation fuel, for example having a % SAF in the range of between 10% and 50%, or between 50% and 100%, or comprising 100% SAF. The present application is however not limited to operation using a sustainable aviation fuel, and any of the parameters described herein may be suitable for use with other fuels.

The sustainable aviation fuel may have a calorific value of at least 43.5 MJ/kg, for example between 43.5 MJ/kg and 44 MJ/kg. The sustainable aviation fuel may alternatively have a calorific value of at least 43.8 MJ/kg, for example between 43.8 MJ/kg and 44 MJ/kg. In some examples, the sustainable aviation fuel may have a calorific value of 43.5, 43.6, 43.7, 43.8, 43.9 or 44.0 MJ/kg, or within a range defined between any two of the values in this sentence.

The sustainable aviation fuel may have an aromatic content of 10% or less by volume. In some examples, the sustainable aviation fuel may have an aromatic content of 5% or lower by volume, or more preferably 1% or lower by volume. In some examples, the sustainable aviation fuel may have an aromatic content by volume of 1, 2, 3, 4, 5, 6, 7, 8 or 9% or less, or may be within a range defined between any two of the values in this sentence Although the fuel properties given in the previous two paragraphs (and elsewhere herein) relate to sustainable aviation fuel, other types of fuel having the same properties may be provided to the combustor by the fuel system.

The controller 908 is also configured to control delivery of the fuel to the fuel spray nozzles 403 of the combustor 16 to bias fuel flow to a subset of the fuel spray nozzles 403 adjacent the one or more ignitors 405 during a re-light procedure. In the example shown, the controller 908 is configured to bias fuel flow to the groups of duplex fuel spray nozzles 403 adjacent the ignitors 405, by delivering fuel wholly or primarily to the primary injectors of those fuel spray nozzles 403 during a re-light procedure. The controller 908 may alternatively be configured to bias fuel flow to any suitable subset of fuel spray nozzles 403 (or subset of fuel injectors of the fuel spray nozzles 403) during a re-light procedure, to increase the likelihood of successful ignition. The subset of fuel spray nozzles 403 to which fuel flow is biased during a re-light procedure may be selected to account for one or more properties of the fuel, for example calorific value, aromatic content or fuel viscosity (for example, fuel viscosity on entry to the combustor at cruise conditions), to increase a likelihood of successful ignition.

In the present example, the controller 908 is configured to bias fuel flow to the nozzles such that the first subset of the plurality of fuel spray nozzles described above receives more fuel than the second subset. The controller 908 is configured to control the fuel distribution valve 909 such that below a staging point fuel is delivered only to the primary fuel injectors of the duplex fuel spray nozzles 403. Above a staging point, the controller 908 is configured to control the fuel distribution valve 909 such that fuel is additionally delivered to the main fuel injectors of the duplex fuel spray nozzles 403 and the single flow fuel spray nozzles 404. The combustor 16 is therefore operated as a staged combustor. As such, the duplex fuel spray nozzles 403 receive more fuel than the single flow fuel spray nozzles 404 (below and optionally above the staging point). The fuel delivery system shown in the Figures is to be understood as one example of how fuel is biased to the fuel spray nozzles, with others being possible. For example, two sets of independent single flow nozzles may be provided. In some examples, the fuel flow may be biased at other engine operating conditions such as during start-up or at low power operation such as while at idle.

Figure 10:
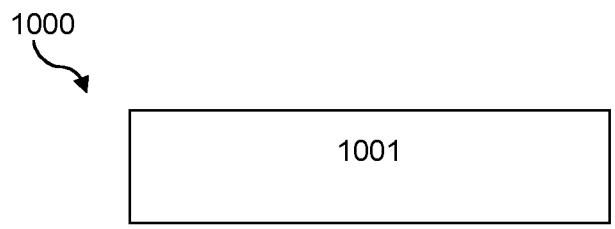
FIGS. 10, 11 and 12 show methods of operating a gas turbine engine in relation to fuel parameters including calorific value, aromatic content and viscosity on entry to the combustor at cruise conditions.

FIG. 10 illustrates a method 1000 of operating a gas turbine engine 10 as described above. The method 1000 comprises providing 1001 fuel to the combustor 16 of the gas turbine engine. The fuel may be or may comprise a sustainable aviation fuel. In the example shown, the fuel has a calorific value of at least 43.5 MJ/kg. In other examples, the fuel may have a calorific value of between 43.5 MJ/kg and 44 MJ/kg. In yet other examples, the fuel may have a calorific value of at least 43.8 MJ/kg. In yet other examples, the fuel may have a calorific value of between 43.8 MJ/kg and 44 MJ/kg. In some examples, the fuel may have a calorific value of 43.5, 43.6, 43.7, 43.8, 43.9 or 44.0 MJ/kg, or within a range defined between any two of the values in this sentence.

Figure 11:
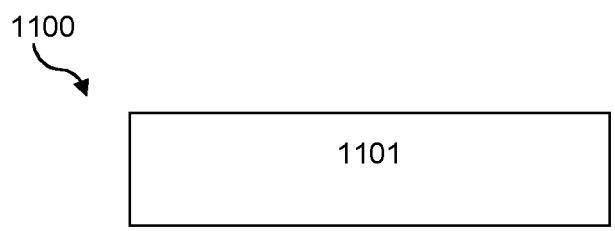

FIG. 11 illustrates a method 1100 of operating a gas turbine engine 10 as described above. The method 1100 comprises providing 1101 fuel to the combustor 16 of the gas turbine engine. The fuel may be or may comprise a sustainable aviation fuel. In the example shown, the fuel has an aromatic content of 10% or lower by volume. In some examples, the fuel may have an aromatic content of 5% or lower by volume, or more preferably 1% or lower by volume. In some examples, the fuel may have an aromatic content by volume of 1, 2, 3, 4, 5, 6, 7, 8 or 9% or less, or may be within a range defined between any two of the values in this sentence.

Figure 12:
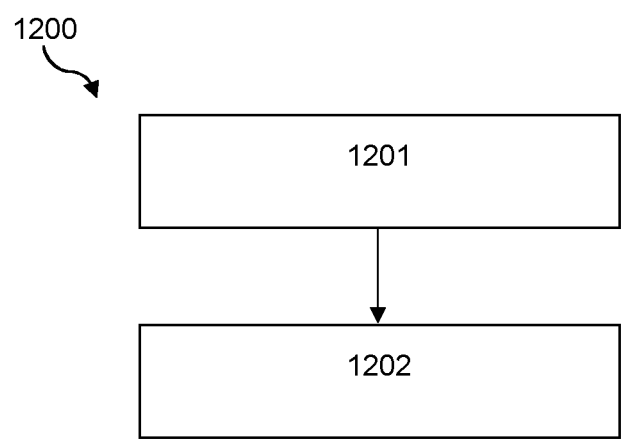

FIG. 12 illustrates a method 1200 of operating a gas turbine engine 10 as described above. The method 1200 comprises transferring 1201 heat from oil to the fuel before the fuel enters the combustor 16 so as to lower a viscosity of the fuel to 0.58 mm$^2$/s or lower on entry to the combustor 16 at cruise conditions, or to lower the fuel viscosity to 0.48 mm$^2$/s or lower on entry to the combustor at cruise conditions. The method 1200 comprises providing 1202 the fuel to the combustor 16 of the gas turbine engine 10. In the example shown, the method 1200 comprises transferring heat 1201 from the oil to the fuel by controlling operation of a fuel-oil heat exchanger 903.

The method 1200 may comprise transferring heat 1201 from the oil to the fuel so as to lower a viscosity of the fuel to between 0.58 mm$^2$/s and 0.30 mm$^2$/s on entry to the combustor 16 at cruise conditions. The method 1200 may comprise transferring heat 1201 from the oil to the fuel so as to lower a viscosity of the fuel to between 0.54 mm$^2$/s and 0.34 mm$^2$/s, 0.50 mm$^2$/s and 0.38 mm$^2$/s, 0.50 mm$^2$/s and 0.35 mm$^2$/s, or preferably between 0.48 mm$^2$/s and 0.40 mm$^2$/s, or between 0.44 mm$^2$/s and 0.42 mm$^2$/s on entry to the combustor at cruise conditions.

The method 1200 may comprise transferring heat 1201 from the oil to the fuel so as to lower a viscosity of the fuel to 0.58, 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s or lower on entry to the combustor 16 at cruise conditions. The method 1200 may comprise transferring heat 1201 from the oil to the fuel so as to lower a viscosity of the fuel so that it is in a range defined between any two of the values in the previous sentence.

The method 1200 may comprise transferring heat 1201 from the oil to the fuel so as to lower a viscosity of the fuel to between 0.55 mm$^2$/s and 0.35 mm$^2$/s, 0.50 mm$^2$/s and 0.35 mm$^2$/s, 0.48 mm$^2$/s and 0.35 mm$^2$/s, 0.48 mm$^2$/s and 0.38 mm$^2$/s, 0.48 mm$^2$/s and 0.40 mm$^2$/s, 0.46 mm$^2$/s and 0.40 mm$^2$/s, 0.44 mm$^2$/s and 0.40 mm$^2$/s, or 0.44 mm$^2$/s and 0.42 mm$^2$/s on entry to the combustor 16 at cruise conditions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of operating a gas turbine engine, the gas turbine engine comprising a staged combustor comprising a controller and an arrangement of fuel spray nozzles, the arrangement of fuel spray nozzles comprising a total number of fuel spray nozzles divided into one or more first subsets and one or more second subsets, each of the fuel spray nozzles in the one or more first subsets is located adjacent one or more ignitors and each of the fuel spray nozzles in the one or more second subsets are circumferentially spaced away from the one or more ignitors, the controller configured to perform the method comprising:

biasing fuel flow to the one or more first subsets of the fuel spray nozzles that are adjacent the one or more ignitors during an in-flight re-light procedure based upon a calorific value of the fuel, wherein the calorific value is at least 43.5 MJ/kg, and to further bias the fuel flow to the one or more first subsets of the fuel spray nozzles adjacent the one or more ignitors at higher power levels.

2. The method of claim 1, wherein the method comprises providing fuel to the combustor having a calorific value of between 43.5 MJ/kg and 44 MJ/kg.

3. The method of claim 1, wherein the method comprises providing fuel to the combustor having a calorific value of at least 43.8 MJ/kg.

4. The method of claim 3, wherein the method comprises providing fuel to the combustor having a calorific value of between 43.8 MJ/kg and 44 MJ/kg.

5. The method of claim 1, wherein the fuel spray nozzles are between 14 and 22 in number and/or a number of the fuel spray nozzles per unit engine core size is in the range 2 to 6.

6. The method of claim 1, wherein the one or more first subsets of fuel spray nozzles comprises at least one half of the total number of fuel spray nozzles.

7. The method of claim 1, wherein the arrangement of fuel spray nozzles comprises duplex nozzles and single flow nozzles.

8. The method of claim 1, wherein the one or more ignitors is at least two ignitors and the one or more first subsets of fuel spray nozzles comprises at least two groups of nozzles, each of the at least two groups of nozzles adjacent a respective one of the at least two or more ignitors.

9. The method of claim 8, wherein the at least two ignitors are symmetrical about a circumference of the combustor.

10. The method of claim 1, wherein:
a) the fuel provided to the combustor has an aromatic content of 10% or lower by volume; and/or
b) the gas turbine engine comprises a fuel-oil heat exchanger, and the method comprises transferring heat from oil to the fuel before the fuel enters the combustor to lower the fuel viscosity to 0.58 mm$^2$/s or lower on entry to the combustor at cruise conditions.

11. A gas turbine engine for an aircraft, comprising:
a staged combustor comprising an arrangement of fuel spray nozzles and one or more ignitors, the arrangement of fuel spray nozzles comprising a total number of fuel spray nozzles divided into one or more first subsets and one or more second subsets. each of the fuel spray nozzles in the one or more first subsets is located adjacent the one or more ignitors and each of the fuel spray nozzles in the one or more second subsets are circumferentially spaced away from the one or more ignitors; and
a controller configured to bias fuel flow to the one or more first subsets of the fuel spray nozzles adjacent the one or more ignitors during an in-flight re-light procedure based upon a calorific value of the fuel, wherein the calorific value is at least 43.5 MJ/kg, and to further bias the fuel flow to the one or more first subsets of the fuel spray nozzles adjacent the one or more ignitors at higher power levels.

12. The gas turbine engine of claim 11, wherein the fuel has a calorific value of between 43.5 MJ/kg and 44 MJ/kg.

13. The gas turbine engine of claim 11, wherein the fuel has a calorific value of at least 43.8 MJ/kg.

14. The gas turbine engine of claim 11, wherein the fuel spray nozzles are between 14 and 22 in number and/or a number of the fuel spray nozzles per unit engine core size is in the range 2 to 6.

15. The gas turbine engine of claim 11, wherein the one or more first subsets of fuel spray nozzles comprises at least one half of the total number of the fuel spray nozzles.

16. The gas turbine engine of claim 11, wherein the arrangement of fuel spray nozzles comprises duplex nozzles and single flow nozzles.

17. The gas turbine engine of claim 11, wherein the one or more ignitors is at least two ignitors and the one or more fist subsets of fuel spray nozzles comprises at least two groups of nozzles, each of the at least two groups of nozzles adjacent a respective one of the at least two or more ignitors.

18. The gas turbine engine of claim 17, wherein the at least two ignitors are symmetrical about a circumference of the combustor.

19. The gas turbine engine of claim 11, wherein:
a) the fuel provided to the combustor has an aromatic content of 10% or lower by volume; and/or
b) the gas turbine engine comprises a fuel-oil heat exchanger, and the controller is configured to control transfer of heat from oil to the fuel within the fuel-oil heat exchanger before the fuel enters the combustor to lower the fuel viscosity to 0.58 mm$^2$/s or lower on entry to the combustor at cruise conditions.

20. The gas turbine engine of claim 11, wherein the in-flight re-light procedure is during cruise.

* * * * *